United States Patent
Mizukoshi et al.

(10) Patent No.: US 9,586,453 B2
(45) Date of Patent: Mar. 7, 2017

(54) SPRING RETAINER CLIP

(71) Applicants: NEWFREY LLC, Newark, DE (US); SHOWA CORPORATION, Saitama (JP)

(72) Inventors: Suguru Mizukoshi, Tochigi (JP); Seiya Endo, Saitama (JP)

(73) Assignees: Newfrey LLC, New Britain, CT (US); Showa Corporation, Saitama (JP)

( * ) Notice: Subject to any disclaimer, the term of this patent is extended or adjusted under 35 U.S.C. 154(b) by 214 days.

(21) Appl. No.: 14/263,355

(22) Filed: Apr. 28, 2014

(65) Prior Publication Data

US 2014/0230222 A1 Aug. 21, 2014

Related U.S. Application Data

(63) Continuation of application No. PCT/JP2012/078999, filed on Nov. 8, 2012.

(30) Foreign Application Priority Data

Nov. 16, 2011 (JP) ................................ 2011-250678

(51) Int. Cl.
  *F16D 1/00* (2006.01)
  *B60G 11/16* (2006.01)
  (Continued)

(52) U.S. Cl.
  CPC .............. *B60G 11/16* (2013.01); *B62D 65/12* (2013.01); *F16F 1/122* (2013.01); *F16F 1/126* (2013.01);
  (Continued)

(58) Field of Classification Search
  CPC . F16F 1/122; F16F 1/126; F16F 1/127; B60G 11/16; B60G 2204/124; B60G 2204/12422; B60G 15/063; B62D 65/12
  See application file for complete search history.

(56) References Cited

U.S. PATENT DOCUMENTS 2,332,042 A * 10/1943 Asaro ..................... F16F 1/122
 5/264.1
2,871,916 A * 2/1959 Fox ........................ A47C 3/027
 297/267.1
(Continued)

FOREIGN PATENT DOCUMENTS

DE 29809998 U 10/1999
DE 202006004375 U 6/2006
(Continued)

OTHER PUBLICATIONS

Machine-Generated English Translation of German Patent Document DE29809998, retrieved online Aug. 29, 2016, <https://worldwide.espacenet.com>.*

(Continued)

*Primary Examiner* — Daniel P Stodola
*Assistant Examiner* — Matthew R McMahon
(74) *Attorney, Agent, or Firm* — Michael P. Leary

(57) ABSTRACT

A spring restraining clip mounts the axial terminus of a coil spring on the chassis via a spring seat. At least two of three spring restraining members that are circumferentially spaced on the spring restraining clip are the open type of spring restraining member so configured as to clasp and hold coil springs inserted in the axial direction, and one of the spring restraining members is a closed spring restraining member that receives the tip of a coil spring when the coil spring is rotated in the circumferential direction after having been inserted in the open type spring restraining members.

7 Claims, 8 Drawing Sheets

(51) Int. Cl.
*F16F 1/12* (2006.01)
*B62D 65/12* (2006.01)

(52) U.S. Cl.
CPC ... *B60G 2204/124* (2013.01); *Y10T 29/49826* (2015.01)

(56) References Cited

U.S. PATENT DOCUMENTS

| | | | | |
|---|---|---|---|---|
| 3,717,354 A | * | 2/1973 | Ritter | B60G 11/14 267/222 |
| 4,038,711 A | * | 8/1977 | Golembeck | A47C 23/05 5/239 |
| 4,093,198 A | * | 6/1978 | Petersen | A63G 13/08 267/179 |
| 4,474,363 A | * | 10/1984 | Numazawa | B60G 15/063 267/220 |
| 4,521,005 A | * | 6/1985 | Calderoni | F16F 1/122 267/179 |
| 4,728,087 A | | 3/1988 | Wils | |
| 5,171,000 A | | 12/1992 | LaPointe et al. | |
| 5,172,999 A | * | 12/1992 | Ijima | B60G 15/063 267/122 |
| 5,421,565 A | * | 6/1995 | Harkrader | B60G 11/16 267/153 |
| 6,149,171 A | * | 11/2000 | Bono | F16F 1/126 280/124.179 |
| 6,254,072 B1 | * | 7/2001 | Bono | F16F 1/126 267/220 |
| 6,869,067 B2 | * | 3/2005 | Duval | F16F 1/126 267/179 |
| 7,275,789 B2 | * | 10/2007 | LaPointe | A47C 3/021 297/258.1 |
| 7,490,818 B2 | * | 2/2009 | Kato | B60G 11/16 267/219 |
| 7,806,392 B2 | * | 10/2010 | Ishikawa | B60G 15/063 267/179 |
| 2010/0109428 A1 | * | 5/2010 | Yamashita | B60T 13/57 303/31 |
| 2014/0265081 A1 | * | 9/2014 | Nakano | B60G 11/16 267/220 |

FOREIGN PATENT DOCUMENTS

| | | |
|---|---|---|
| FR | 2538085 A | 6/1984 |
| JP | 9-100858 A | 4/1997 |
| JP | 2008024158 A | 2/2008 |
| JP | 2008068723 A | 3/2008 |
| JP | 4367835 B | 11/2009 |
| JP | 5222260 B | 3/2013 |

OTHER PUBLICATIONS

European Extended Search Report (EESR) dated Dec. 18, 2015 generated in counterpart EP Application No. 12849823.5.

* cited by examiner

SPRING RETAINER CLIP

CROSS-REFERENCE TO RELATED APPLICATIONS

This application is a continuation of PCT Application No. PCT/JP2012/78999, filed Nov. 8, 2012, which claims priority of Japanese Patent Application No. 2011-250678, filed on Nov. 16, 2011, the disclosure of which is incorporated herein by reference.

BACKGROUND OF THE INVENTION

The present invention concerns a spring restraining clip, specifically a spring restraining clip used when incorporating a coil spring in a device such as an automotive hydraulic shock absorber.

A coil spring is attached to a spring restraining clip in conventional hydraulic shock absorbers. The spring restraining clip is mounted on the chassis side and the wheel side via spring seats. A plurality of spring restraining members are installed in the spring restraining clip in order to increase the spring restraining force. For example, Patent Reference 1 discloses a spring restraining clip provided with four spring restraining members.

In addition, a plurality of spring seat locking pawls are mounted in the spring restraining clip in order to increase the spring seat retention force. For example, Patent Reference 2 discloses a spring restraining clip provided with five spring seat locking pawls (mounted member 42). Patent Reference 3 discloses a spring restraining clip provided with six spring seat locking pawls (positioning member 45).

PRIOR ART

Patent References

Patent Reference 1: Japanese Kokai Publication 2008-24158, Gazette
Patent Reference 2: Japanese Kokai Publication 2005-155808, Gazette
Patent Reference 3: Japanese Kokai Publication 2011-63200, Gazette The spring restraining clip of Patent Reference 1 is stiff since it has four spring restraining members. It requires great force to fit in place and is a burden on workers. An additional problem is the need to apply a certain level of depressing force on a spring in order to disengage the spring when attached to the spring restraining clip if it is too loose.

A burden is also imposed on workers when a plurality of spring seat locking pawls are used, as in the spring restraining clip of Patent References 2 and 3, since attaching a spring seat to a spring restraining clip involves manual work.

Another problem is that a spring can catch on a spring retaining pawl and the spring retaining pawl can be damaged when inserting a spring from above in a spring restraining member of a spring restraining clip in other conventional technology. Another problem is that it is difficult to insert a spring in a spring restraining member if the spring inner diameter is great when spring restraining members are disposed on the restraining clip so that they are diametrically opposed to one another. The spring restraining members are turned up when insertion is difficult in this manner, and they no long carry out their clip role. A final problem is that distortion develops in the spring seat locking pawls due to the spring weight, which results in their susceptibility to detachment.

An object of the present invention is to resolve the aforementioned issues associated with the known art by providing a spring restraining clip that improves operational efficiency when mounting springs and spring seats and that enhances the restraining force of the spring and the retention force of the spring seat.

SUMMARY OF THE INVENTION

The present invention provides a spring restraining clip for mounting the axial terminus of a coil spring on the chassis via a spring seat, said spring retaining clip comprising at least three spring restraining members separately placed in the circumferential direction, wherein two of the aforementioned spring restraining members are the open type of spring restraining member structured so as to clasp and hold coil springs inserted in the axial direction, and one of the aforementioned spring restraining members is a closed spring restraining member that accepts the tip of a coil spring due to rotational movement in the circumferential direction of the coil spring inserted in the aforementioned axial direction.

In one embodiment of the present invention, the aforementioned closed spring restraining member has a loop structure in which the travel path in the circumferential direction of a coil spring that is moved rotationally is covered by a bridge. It has a spring tab that extends obliquely downward in the direction of travel of the coil spring from the bridge. It is structured so that said spring tab will contact the coil spring to apply thrust force to the coil spring.

In another embodiment of the present invention, the aforementioned open type of spring restraining member has a spring retaining pawl to arrest looseness of the coil spring that had been inserted, and it has ribs to prevent the aforementioned spring retaining pawl from turning up during spring insertion.

In still another embodiment of the present invention, at least three spring locking pawls are provided on the side opposite the side provided with the aforementioned spring restraining member in order to attach the spring seat.

Still another embodiment of the present invention is structured so that the aforementioned spring locking pawls all have different structures.

A further embodiment of the present invention is structured so that the aforementioned spring locking pawls extend in the radial direction inwardly so as to compensate for deformation due to the spring load.

Yet another embodiment of the present invention is structured so that the aforementioned spring restraining members will not be disposed on the restraining clip so that they are diametrically opposed to one another.

These arrangements of the spring restraining clip of the present invention yield several benefits. The burden on workers is reduced, and operational efficiency is improved since there are fewer spring restraining members in the present invention in comparison with the known art. Furthermore, the spring restraining force is not reduced, since one of the spring restraining members is a closed spring restraining member.

The final structure facilitates spring insertion and renders removal more difficult by mounting a spring tab in the aforementioned closed spring restraining member that extends obliquely downward in the direction of travel of the coil spring from the bridge, and the spring can be reliably restrained independently of the size of the spring.

The spring retaining pawl can be prevented from turning up and subsequently suffering damage by mounting ribs in the aforementioned open type of spring restraining member to prevent the spring retaining pawl from being turned up during insertion of the spring.

The burden on workers is reduced, and operational efficiency is improved by reducing the number of spring locking pawls in comparison to the known art.

The structure facilitates spring insertion and renders removal more difficult by restricting the mounting sequence since the spring locking pawls all have different structures, which thus prevents reduction in the retention force of the spring seat.

Furthermore, detachment of the spring seat from the spring restraining clip can be prevented even if deformation develops in the spring locking pawls by providing a structure such that the spring locking pawls extend radially inwardly so as to compensate for deformation due to the spring load.

The spring restraining members can be prevented from turning up even if the spring inner diameter is great by providing a structure in which the spring restraining members are not disposed on a diagonal line.

DETAILED DESCRIPTION OF THE PREFERRED EMBODIMENTS

The spring restraining clip pursuant to the first embodiment of the present invention shall now be explained with reference to the appended figures.

Figure 1:
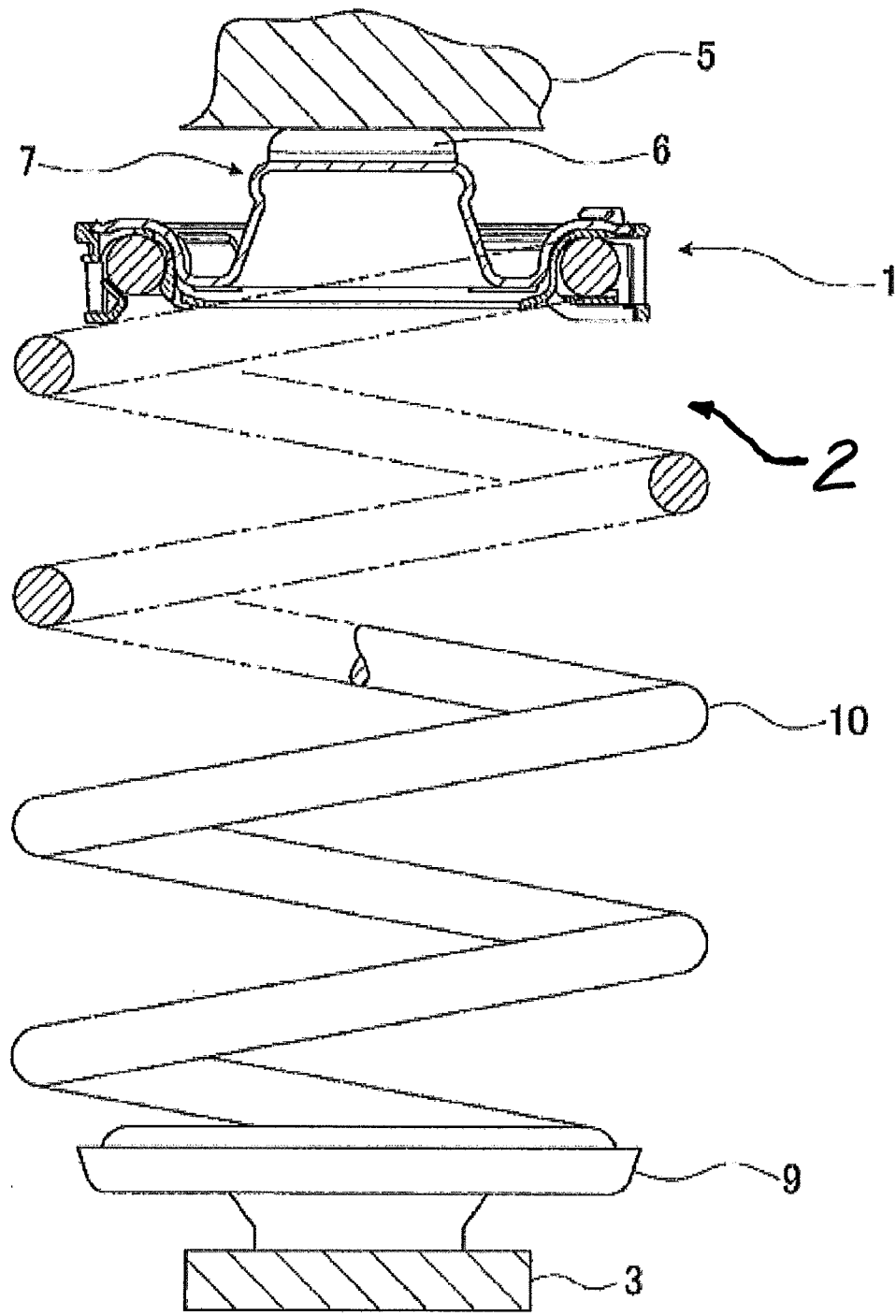
FIG. 1 is a cross-sectional view of a hydraulic shock absorber that incorporates a spring restraining clip pursuant to one embodiment of the present invention.

As shown in FIG. 1, spring restraining clip 1 is used in a hydraulic shock absorber 2 of an automobile. Hydraulic shock absorber 2 is provided with a wheel side mounting bracket 3 mounted to the wheel, and a chassis side mounting bracket 5 mounted to the chassis. Thrust bearing 6 is supported on the chassis side mounting bracket 5 on the back side, and upper spring seat 7, defining a curved contour portion, is attached to the thrust bearing 6. At the other end, lower spring seat 9 is attached to the wheel side mounting bracket 3, and coil spring 10 is interposed between the upper spring seat 7 and the lower spring seat 9. Concretely, the coil spring 10 is supported on the lower spring seat 9 and is supported on the upper spring seat 7 via the spring restraining clip 1.

Figure 2:
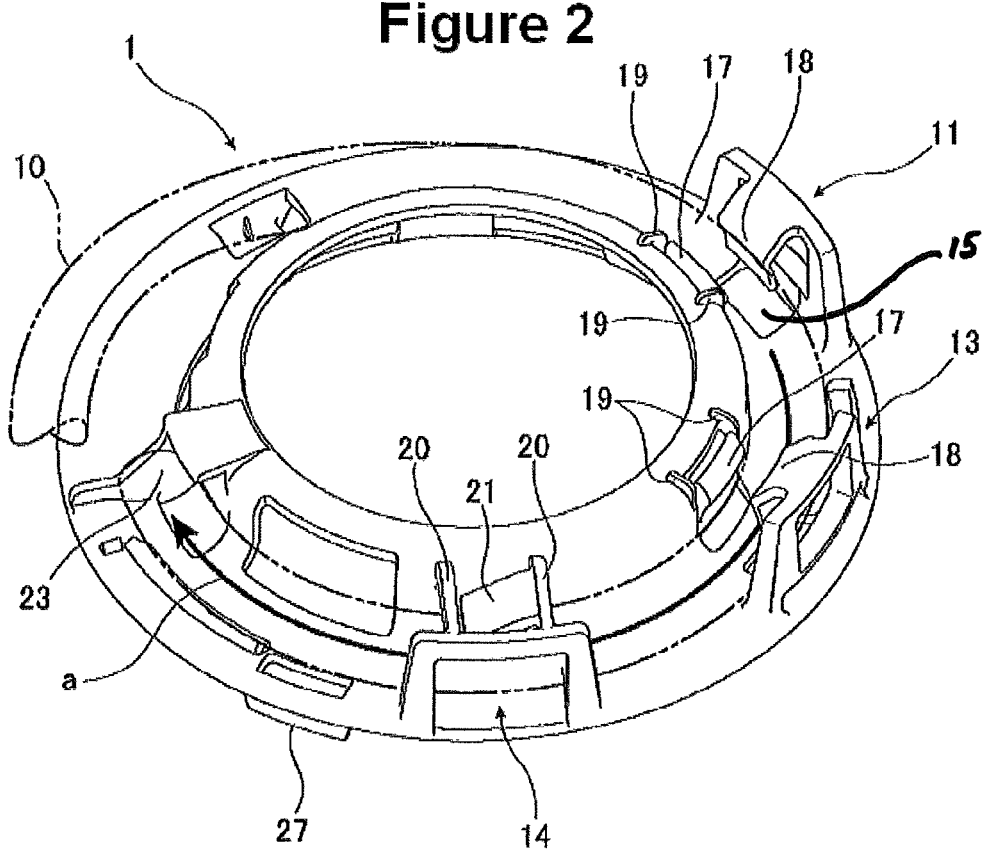
FIG. 2 is an oblique view of the spring restraining clip pursuant to the first embodiment of the present invention viewed from the spring insertion side.
Figure 3:
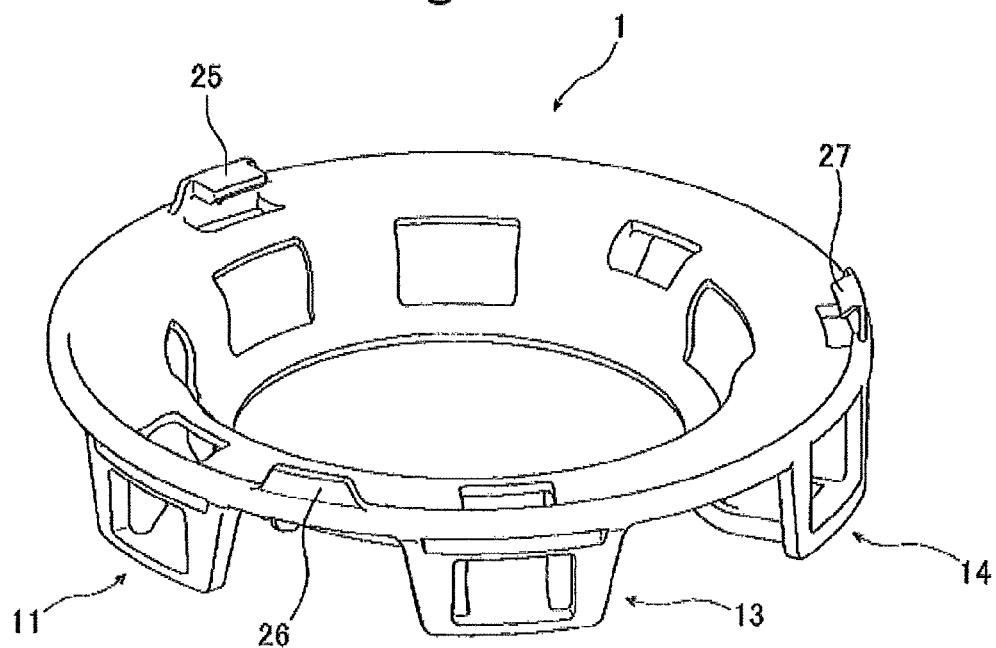
FIG. 3 is an oblique view of the spring restraining clip of FIG. 2 viewed from the spring seat insertion side.
Figure 6:
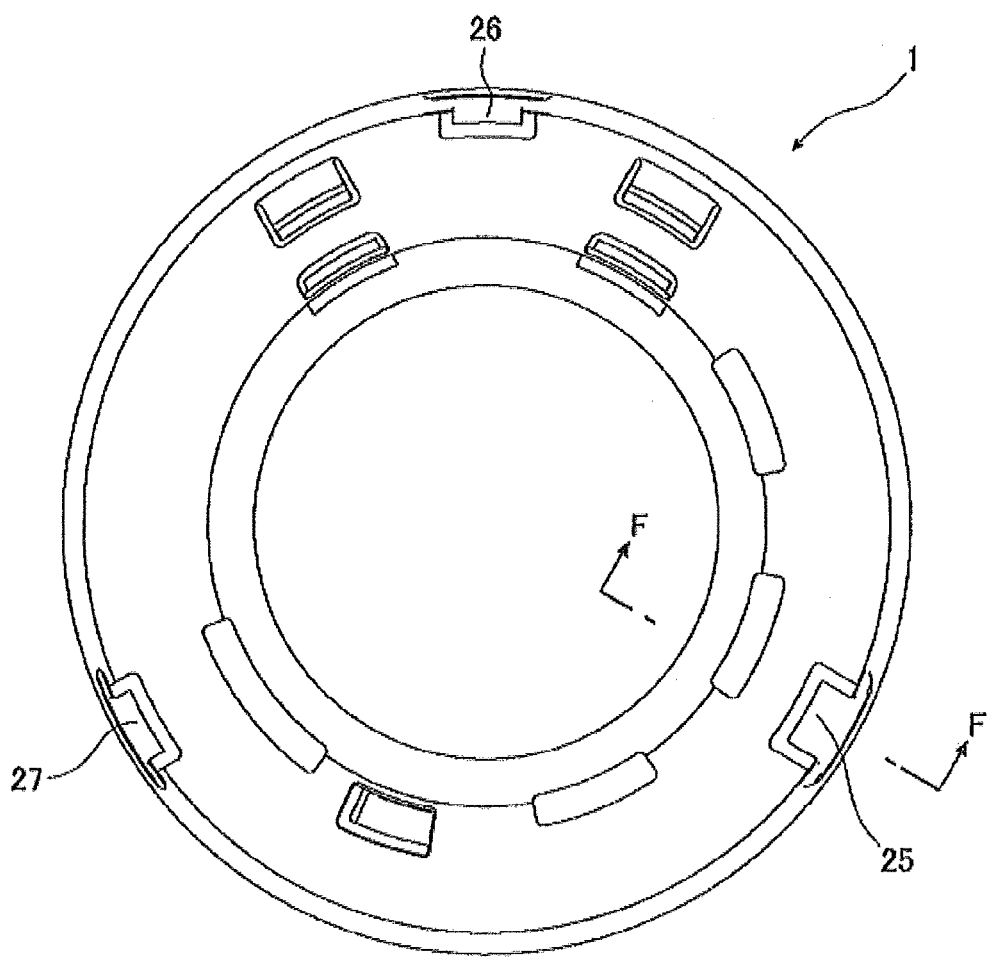
FIG. 6 is a plan view of FIG. 3.

FIGS. 2 and 3 are oblique views of the spring restraining clip 1. FIG. 2 is a view from the lower (wheel) side of FIG. 1. FIGS. 3 and 6 are views from the spring seat insertion side, specifically from the upper side of FIG. 1. The spring restraining clip 1 has a ring-shaped structure with an internal space to house part of the upper spring seat, and a curved upper surface contoured to conform to the curved contour portion of the upper spring seat, as shown in FIG. 1.

Three spring restraining members are separately placed in the circumferential direction of the spring restraining clip 1 to restrain the terminus of the coil spring 10 in the axial direction, as shown in FIG. 2. Two of the spring restraining members are the open type of spring restraining members 11, 13 while the other one is a closed spring restraining member 14.

Figure 4:
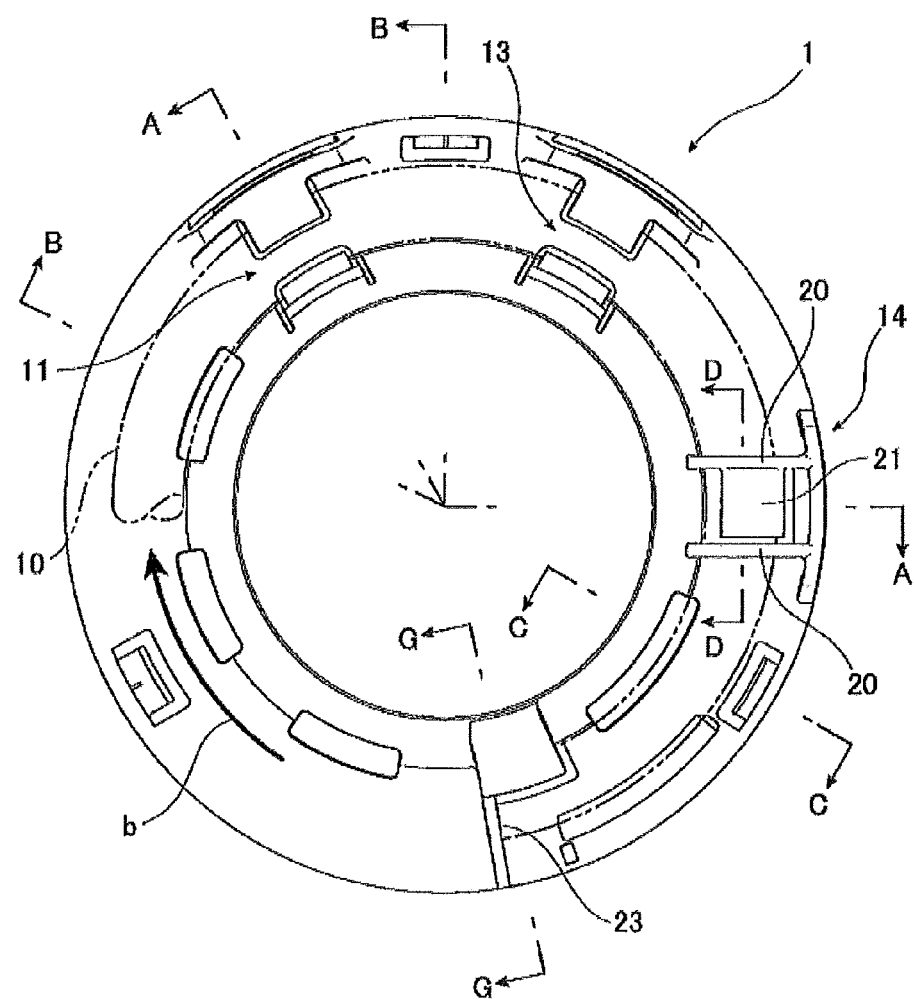
FIG. 4 is a plan view of FIG. 2.
Figure 5:
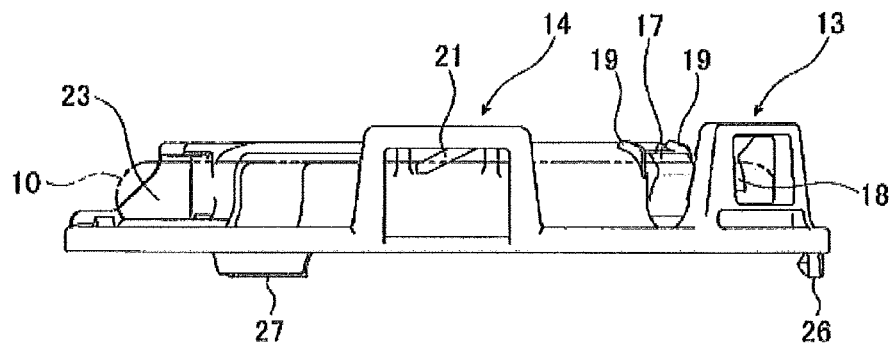
FIG. 5 is a right side view of FIG. 4.
Figure 7:
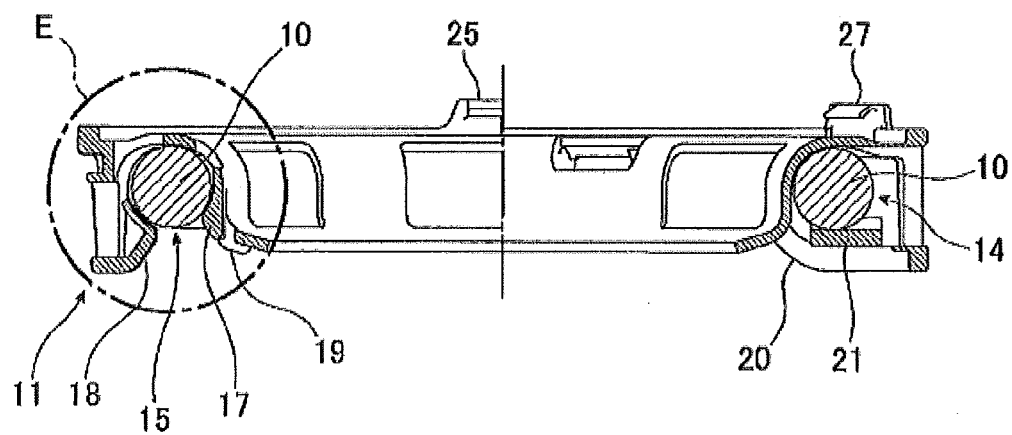
FIG. 7 is an A-A cross-sectional view of FIG. 4.
Figure 8:
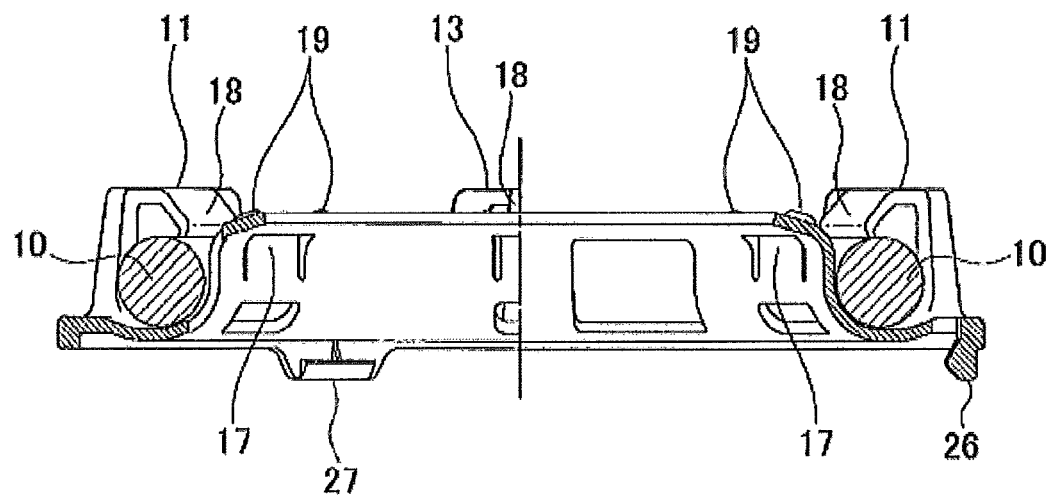
FIG. 8 is a B-B cross-sectional view of FIG. 4.
Figure 9:
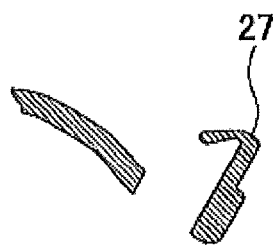
FIG. 9 is a C-C cross-sectional view of FIG. 4.
Figure 11:
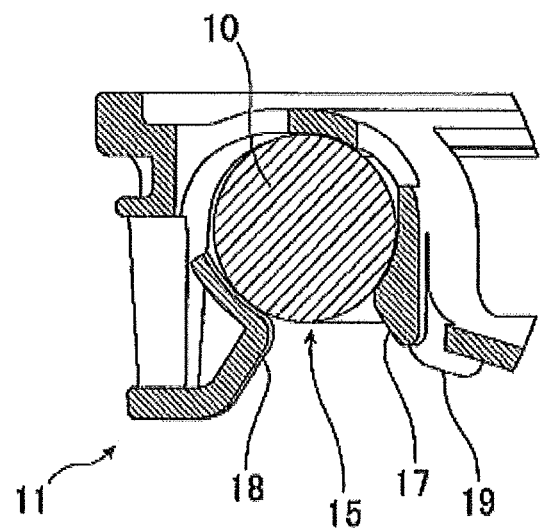
FIG. 11 is an enlarged diagram of area E of FIG. 7.
Figure 12:
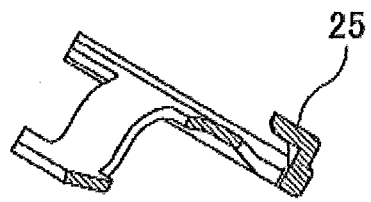
FIG. 12 is an F-F cross-sectional view of FIG. 6.

The tops of the open type of spring restraining members 11, 13 are open from above in FIG. 2 (from below in FIG. 7 and FIG. 11) in order to allow the insertion of the coil spring 10. Retaining space 15 (FIGS. 2 and 7) is formed within in order to retain the coil spring 10. As shown in FIGS. 4, 5 and 8, inner spring retaining pawl 17 and outer spring retaining pawl 18 are mounted at the inner and outer edges, respectively, of the entry of the retaining space 15 in the radial direction. Loosening of the coil spring 10 fitted in the retaining space 15 is prevented by inner and outer spring retaining pawls 17 and 18.

Figure 14:
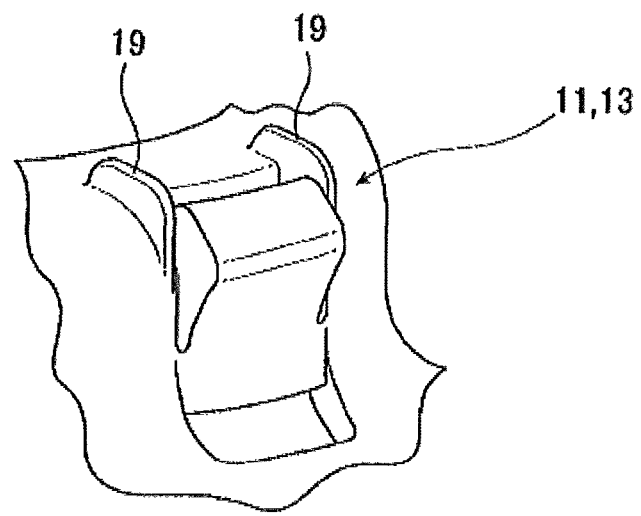
FIG. 14 is an oblique detail view for illustrating the shape of the rib in FIG. 11.
Figure 15:
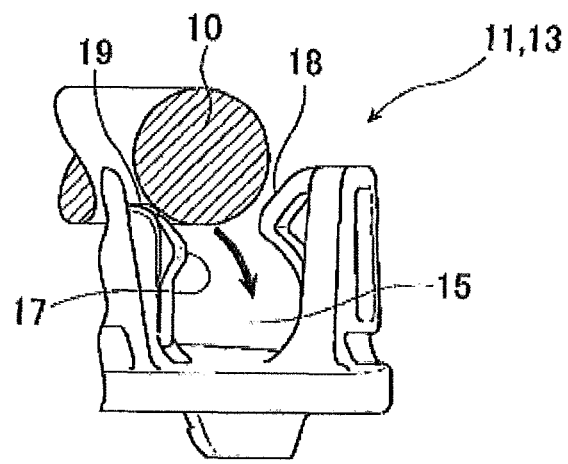
FIG. 15 is a cross-sectional view similar to FIG. 11 to illustrate the guiding action of the rib in FIG. 14.

A pair of ribs 19 is mounted in the open type of spring restraining members 11, 13 adjacent to both edges of the inner spring retaining pawl 17 in the circumferential direction (see FIG. 14). The ribs 19 act as guides when inserting the coil spring 10 in the open type of spring restraining members 11, 13 (see FIG. 15). By so doing, the inner spring retaining pawl 17 can be prevented from turning up when inserting the spring.

Figure 10:
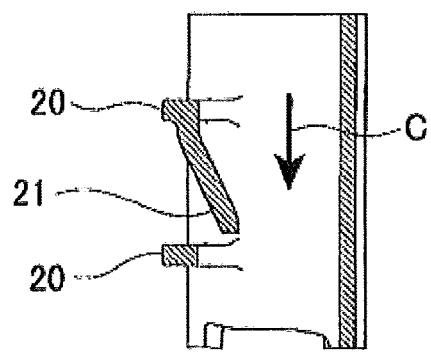
FIG. 10 is a D-D cross-sectional view of FIG. 4.

The upper section of the closed spring restraining member 14 has a loop structure covered by bridge 20, as shown in FIG. 2. The tip of the coil spring is received therein by rotating the coil spring that had been inserted in the open type of spring restraining members 11, 13 in the circumferential direction. The arrows a, b and c in FIG. 2, FIG. 4 and FIG. 10, respectively, illustrate the direction of rotational movement of the spring at that time.

A spring tab 21 that extends obliquely downward in the direction of travel of the coil spring 10 from the bridge 20 is mounted in the closed spring restraining member 14. It is structured so that the spring tab 21 would contact the coil spring 10 to apply thrust force to the coil spring 10. By so doing, movement of the coil spring 10 in the direction of movement denoted by the arrows (FIG. 2, FIG. 4, and FIG. 10, a, b and c respectively) would be facilitated while movement in the opposite direction would be impeded, thus completing a structure that renders insertion easy and removal difficult.

Figure 13:
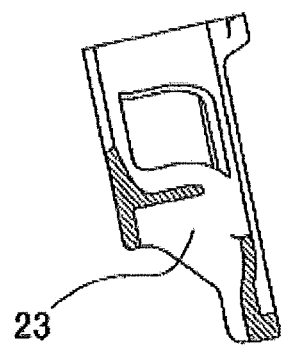
FIG. 13 is a G-G cross-sectional view of FIG. 4.

In addition, stopper 23 is mounted in the spring restraining clip 1 in order to arrest the tip of coil spring 10 that had been inserted in the closed spring restraining member 14, as shown in FIGS. 5 and 13.

As shown in FIGS. 2, 4 and 6, spring restraining members 11, 13, 14 are structured so as not to be disposed on the restraining clip 1 on an imaginary diagonal line through the center of the restraining clip, and are thus disposed on the restraining clip so as not to be diametrically opposed to one another. By so doing, the spring restraining members are not turned up even if the spring has a large internal diameter.

Figure 16A:
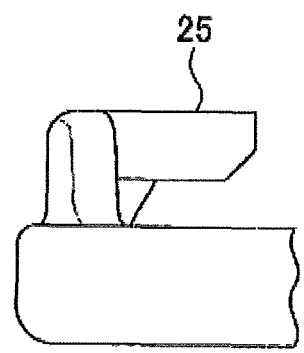
FIG. 16A is a partial enlarged diagram of FIG. 3 illustrating an example of the structure of the spring locking pawl.
Figure 16B:
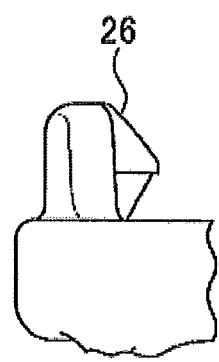
FIG. 16B is a partial enlarged diagram of FIG. 3 illustrating an example of a structure that differs from that of FIG. 16A.
Figure 16C:
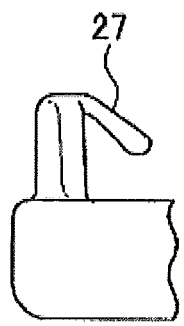
FIG. 16C is a partial enlarged diagram of FIG. 3 illustrating an example of a structure that differs from those of FIG. 16A and of FIG. 16B.

As shown in FIGS. 3 and 6, three spring seat locking pawls 25, 26, 27 are mounted on the spring restraining clip 1 on the side opposite from the side shown in FIG. 2. These three spring seat locking pawls 25, 26, 27 have mutually different structures. For example, they have the structures shown in FIGS. 9, 12, 16A, 16B and 16C. In this case, a worker could easily insert the upper spring seat 7 in the spring restraining clip 1 by following the insertion sequence of spring seat locking pawls 25, 26, 27 so that the final insertion would be of the spring seat locking pawl 27 with the structure shown in FIG. 16C (for example, 25→26→27) (See FIG. 6).

In addition, when deformation due to a spring load develops in the spring seat locking pawls 25, 26, 27, detachment of the spring seat 7 from the spring restraining clip 1 can be prevented even if deformation develops in the spring seat locking pawls, by providing a structure (see the structure shown in FIG. 16A) such that the spring seat locking pawls 25, 26, 27 extend inwardly in the radial direction so as to compensate for deformation due to the spring load.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A spring restraining clip for mounting the axial terminus of a coil spring on a vehicle chassis via a spring seat, comprising:
   three circumferentially-spaced spring restraining members disposed on one side of the spring restraining clip; wherein
   two of the spring restraining members are open-type spring restraining members, such that they are configured to clasp and hold the coil spring when the coil spring is inserted into the open-type spring restraining members in an axial direction along a longitudinal axis of the coil spring;
   one of the spring restraining members is a closed-type spring restraining member, such that it is configured to receive and axially retain a tip of the coil spring when the coil spring is rotated in a circumferential direction after the coil spring is inserted in the open-type spring restraining members;
   the coil spring defines a circumferential travel path when it is rotated in said circumferential direction;
   the closed-type spring restraining member defines a loop structure covered by a bridge;
   the circumferential travel path lies under the bridge;
   the closed-type spring restraining member further includes a spring tab that extends obliquely downwardly from the bridge in the direction of travel of the coil spring; and wherein
   the spring tab is so structured as to contact the coil spring to apply thrust force to the coil spring.

2. The spring restraining clip of claim 1, wherein:
   the open-type of spring restraining members each includes a spring retaining pawl to arrest looseness of an inserted coil spring, and further includes ribs to prevent the spring retaining pawl from turning up during spring insertion.

3. The spring restraining clip of claim 2, wherein three circumferentially-spaced spring seat locking pawls for attaching the spring seat are disposed on the side of the spring restraining clip opposite the side on which are disposed the spring restraining members.

4. The spring restraining clip of claim 3, wherein the spring seat locking pawls are so configured as to have different structures.

5. The spring restraining clip of claim 4, wherein the spring seat locking pawls include respective portions extending radially inwardly so as to compensate for deformation of the spring seat locking pawls due to spring load.

6. The spring restraining clip of claim 5, wherein the spring restraining members are disposed on the spring restraining clip so as not to be diametrically opposed to one another.

7. The spring restraining clip of claim 1, wherein movement of the coil spring in the direction of travel is facilitated, while movement in the opposite direction is impeded.

* * * * *